United States Patent [19]
Fell et al.

[11] Patent Number: 5,127,217
[45] Date of Patent: Jul. 7, 1992

[54] ROUND BALER HAVING WIDE WINDROW CONVERGING MECHANISM

[75] Inventors: Ferol S. Fell, Newton; Stanley R. Clark; Howard J. Ratzlaff, both of Hesston, all of Kans.

[73] Assignee: Hay & Forage Industries, Hesston, Kans.

[21] Appl. No.: 682,485

[22] Filed: Feb. 27, 1991

[51] Int. Cl.⁵ .................. A01D 43/02; A01D 78/04; A01D 78/16
[52] U.S. Cl. ........................................ 56/341; 56/364
[58] Field of Search ............... 56/341, 364, 362, 363, 56/367, 377, 16.4; 100/88

[56] References Cited

U.S. PATENT DOCUMENTS

| | | | |
|---|---|---|---|
| 2,731,782 | 1/1956 | Mason | 56/11.9 |
| 2,893,192 | 7/1959 | Tallman | 56/10.6 |
| 3,125,845 | 3/1964 | Lee | 56/364 |
| 4,077,189 | 3/1978 | Hering | 56/341 X |
| 4,119,026 | 10/1978 | Sacht | 56/341 X |
| 4,182,103 | 1/1980 | McNutt | 56/364 |

Primary Examiner—Stephen J. Novosad
Attorney, Agent, or Firm—Hovey Williams Timmons & Collins

[57] ABSTRACT

A pair of separate, obliquely disposed, angled-in rakes of the rotating tine bar type are mounted slightly forwardly of the pickup in the marginal areas along side the path of travel of the pickup to engage outlying materials and converge them inwardly into the main portion of the windrow as the baler advances. The tine bars are driven independently of forward motion of the baler by drive mechanism on the baler, and each of the rakes is provided with its own gauge wheel to permit the rake to rise and fall relative to the baler as changes in ground contour are encountered. The rakes slightly overlap the pickup in a lateral sense at their inner end so as to assure discharge of the crop material into the path of travel of the oncoming pickup, and the discharge ends of the rakes are spaced forwardly of the pickup a sufficient distance as to permit the velocity of the rake material to be substantially diminished by the time it is engaged by the pickup.

4 Claims, 2 Drawing Sheets

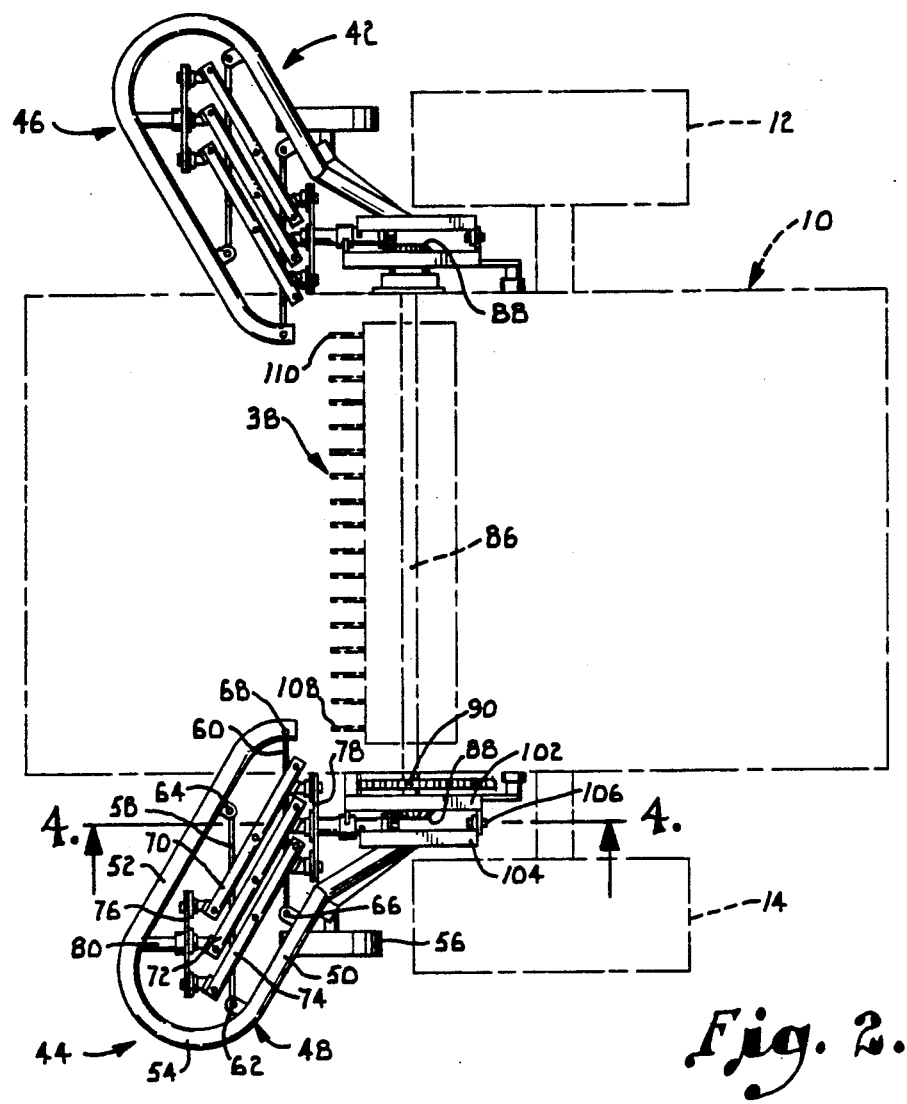
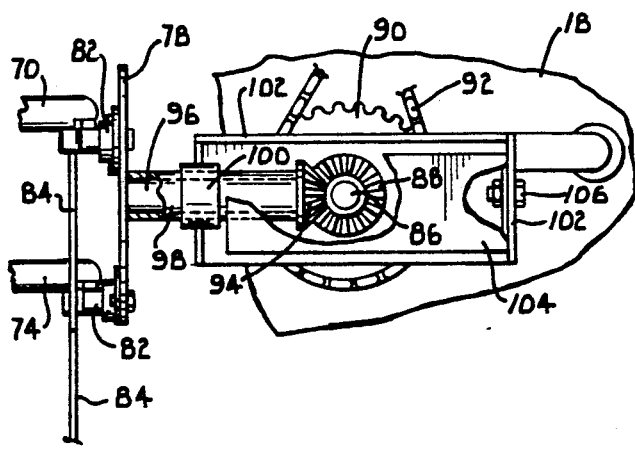
Fig. 2.
Fig. 4.

ROUND BALER HAVING WIDE WINDROW CONVERGING MECHANISM

TECHNICAL FIELDS

This invention relates to the field of round balers and, more particularly, to mechanism which may be attached to such machines for raking wide portions of a windrow into the path of travel of the pickup of the baler as the machine is advanced.

BACKGROUND

It is a common practice to attach so-called "crowder wheels" onto the front end of a round baler so that, as the baler moves along the windrow, wide portions of the windrow which might otherwise lie outside of the baler's pickup mechanism are gathered inwardly far enough to be lined up with the baler. See, for example, U.S. Pat. Nos. 3,678,669; 4,182,103; 4,214,429; and 4,446,685.

Such crowder wheels present a number of problems, however. For one thing, they must be mounted on the baler in such a manner that they are far enough ahead of the pickup to engage the hay and complete its transferring movement inwardly by the time the pickup comes along and engages the transferred hay. They must also be mounted in oblique, angled relationship to the path of progress of the machine so as to deflect the crop inwardly, and at the same time, they must be made rotatable so that when the ground is engaged they can simply spin in a free-wheeling rather than shove the earth and materials along like a bulldozer or snow plow. It is also necessary that the wheels be able to swing up and down independently of the baler to yield for rocks and variations in ground contour as the baler moves along, all of which leads to some less than ideal mounting arrangements in order to accommodate these needs.

Moreover, since the crowder wheels are circular, they present a relatively small effective crop engaging area adjacent their lower portions at any one point in time. Although the wheels can be increased in diameter and thus increase the surface area that is in contact with the crop materials for better control, there are normally space limitations that prevent the wheels from exceeding a certain maximum diameter. Sometimes, when the baler is going slow or heavy crop conditions are encountered, the crowder wheels barely rotate. Yet, this is precisely the time when the converging action may be needed the most to move the materials into the path of the pickup.

SUMMARY OF THE PRESENT INVENTION

Accordingly, it is an important object of the present invention to provide a new windrow converging mechanism on a round baler which avoids the problems and shortcomings associated with prior crowder wheel designs.

To this end, the present invention contemplates attaching a pair of oppositely located, inwardly angled rake mechanisms to a baler forwardly of the pickup and in the marginal areas outboard of the latter in which the raking action is primarily linear in nature rather than rotary, as with the crowder wheels. It has been found in this respect that rake mechanisms conforming in principle of operation to so-called "rolling bar rakes" currently available from a number of farm equipment manufacturers are preferred for this type of operation, since they may be constructed in a variety of different lengths to project out wider or narrower, as the case may be, without increasing their height. In its preferred form, each rake mechanism includes a plurality of tine bars connected between a pair of mounting discs that face fore-and-aft but are offset laterally from one another so that the tine bars are angled inwardly and rearwardly generally toward the pickup. As the discs are driven, the tine bars are driven in elliptical paths of travel with the tines remaining upright so as to deflect and feed inwardly hay that is engaged by the rake mechanisms during their forward movement with the baler. Also in preferred forms the rakes are mounted in a floating manner so as to accommodate changes in ground contour without inhibiting their raking actions. Also in preferred form, the rakes are used in connection with a baler having a bottom entrance to its baling chamber in which the pickup is used not only to lift materials off the ground, but also to feed the materials through the entrance of the chamber where it is coiled into a bale. Although one solution to the overly wide windrow problem might be to simply use a wider pickup on the baler, that means some type of additional auger-like converging structure would need to be utilized behind the pickup to take the material from that point and narrow it down sufficiently to match the width of the baling chamber of the machine before it could then be introduced into such chamber. This would necessitate locating the pickup farther forward from the entrance to the chamber than presently contemplated in machines of this nature, thus requiring the use of additional feeding mechanism to take the material from the converging apparatus and feed it into the chamber, all of which would necessitate more costly and complicated mechanism than ideally utilized.

BRIEF DESCRIPTION OF THE DRAWINGS

FIG. 2 is a top plan view of the converging mechanism of the present invention showing the baler of FIG. 1 in phantom for the purpose of illustrating the spatial relationships between the pickup of the baler and the discharge ends of the two separate rakes of the converging mechanism;

FIG. 4 is an enlarged, fragmentary cross-sectional view through the left rake and associated mounting and drive apparatus taken substantially along line 4—4 of FIG. 2.

DETAILED DESCRIPTION

Figure 1:
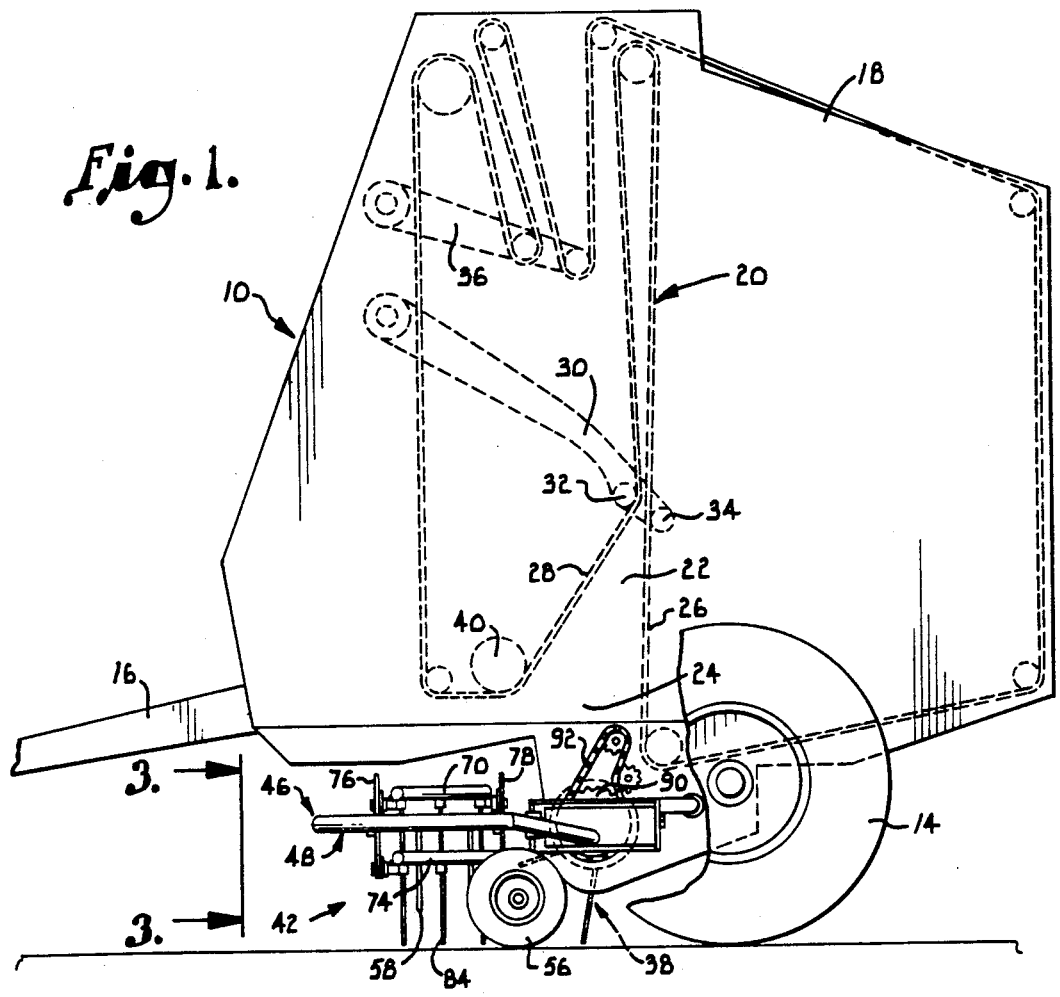
FIG. 1 is a left side elevational view of a baler incorporating converging mechanism in accordance with the principles of the present invention, the near ground wheel of the baler being broken away to reveal details of construction and important mechanisms such as the bale-forming belts and other structures being illustrated in phantom lines to provide a full understanding of the nature of the baler and the converging mechanism.

The baler 10 shown for purposes of illustration preferably incorporates the principles of the balers disclosed in U.S. Pat. Nos. 4,182,101 and 4,440,075. Said patents are hereby incorporated by reference into the present disclosure where need be for a full and complete understanding of the present invention.

As will be readily understood by those skilled in the art, the baler 10 includes a pair of ground wheels 12 and 14 to support the baler for movement across the ground, pulled by a tractor (not shown) through a tongue 16. The baler has a pair of opposite side walls, only the near sidewall 18 being illustrated (FIG. 1), which are spaced apart to define an open area therebetween which is occupied by mechanism for forming the crop into a round bale as the baler 10 is advanced. Although it is within the principles of the present invention that the baler 10 could be of the fixed chamber type, a variable chamber baler has been illustrated, such baler having a plurality of bale-forming belts 20 positioned between the sidewalls for the purpose of acting upon the hay and forming it into a bale. In the illustrated embodiment, the belts 20 are adapted to initially present a baling chamber 22 of relatively small dimensions compared to its final size, such chamber 22 having a bottom entrance 24 and initially having an upright rear belt stretch 26 and a generally upright though forwardly and downwardly inclined belt stretch 28. The rear stretch 26 is driven in such a direction that it moves upwardly during startup while the front stretch 28 moves generally downwardly, thus imparting a forward tumbling and coiling action to hay that is introduced to the chamber 22 via the bottom entrance 24. As the bale grows within the chamber 22, an overhead confinement arm 30 carrying a pair of twin guide rollers 32 and 34 for the belt stretches 26,28 swings upwardly to allow the belt stretches 26 and 28 to deflect in fore-and-aft directions to encompass the enlarging bale, while at the same time additional slack is paid out by the overhead slack control assembly 36. Yieldable means associated with the slack control assembly 36 helps maintain tension in the belts 20 so as to apply a compactive as well as a driving or rolling action to the bale during its formation.

The baler 10 is also provided with a crop pickup 38 which is located generally beneath the entrance 24 and slightly forwardly of the ground wheels 12,14 for picking up crop materials on the ground and delivering them into and through the entrance 24 as the machine advances. It is not outside the concepts of the present invention to have an additional roller or the like immediately behind the pickup 38 for assisting in bale starting and formation, but in its preferred form the baler 10 utilizes only the pickup 38 for feeding the hay into the entrance 24. Although not illustrated in the drawings, it is to be understood that a small starter roller is frequently positioned adjacent the lower extremity of the front belt stretch 28 in the area of the entrance 24 to keep the weight of the growing bale off the adjacent belt drive roller 40 and to assist in starting the core of the bale. It will be readily understood by those skilled in the art that the rear half of the baler 10 may be opened when the bale is full sized to permit discharging of the bale, and suitable wrapping mechanism capable of applying either twine or other materials such as plastic net wrap is also preferably provided.

The baler 10 is provided with windrow converging mechanism broadly denoted by the numeral 42. In its preferred form, the mechanism 42 includes a pair of left and right rakes 44 and 46 which are generally stationed on opposite sides of the bale out in front of the pickup 38 and outboard of the latter. Preferably, the rakes 44 and 46 are similar in concept to so-called "rolling bar rakes" that are currently available from a number of farm equipment manufacturers, although in certain respects, the rakes 44 and 46 are especially adapted for use in connection with the round baler 10. Each rake 44,46 includes a generally U-shaped in plan frame 48 which has an outwardly extending, forwardly angled arm 50, a forwardly spaced parallel and inwardly angled arm 52, and a curved bight 54 that integrally interconnects the arms 50 and 52. Each frame 48 is also provided with a small gauge wheel 56 mounted beneath the arm 50 for rotation about a transverse axis to support the frame 48 for over the ground travel and to accommodate changes in ground contour relative to the main portion of the baler 10, as will hereinafter be made apparent. The frame 48 forms part of what may be termed as a basket for containing moving rake mechanism which will subsequently be described. The other portion of the basket is presented by a pair of arcuate rods 58 and 60 that are underslung with respect to the frame 48 and span the arms 50 and 52 at generally right angles to the path of travel of the baler. Although it is preferred that the rods 58 and 60 be disposed at such right angles relative to the path of travel of the machine, it is within the concepts of the present invention that such rods 58 and 60 will also be at other than right angles. The two rods 58 and 60 are mutually spaced apart in a fore-and-aft direction, the rod 58 being attached to the arms 50 and 52 at connections 62 and 64, respectively, while the rod 60 is connected to the arms 50 and 52 at connections 66 and 68, respectively.

The raking action for each of the rakes 44,46 is provided by three tine bars 70, 72, and 74 extending between a forwardly located mounting disc 76 and a rearwardly located mounting disc 78. The two discs 76,78 face in a fore-and-aft direction but are spaced laterally from one another as well as fore-and-aft of one another. The front disc 76 is mounted for rotation about an stub shaft 80 extending rearwardly from the front frame arm 52, while the rear disc 78 is mounted for rotation about a fore-and-aft axis by means yet-to-be described.

Figure 3:
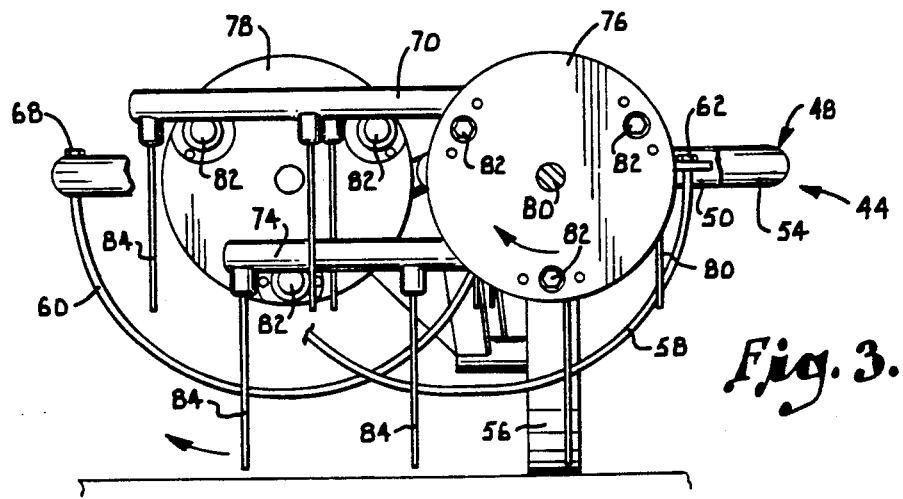
FIG. 3 is an enlarged, fragmentary front elevational view of the left rake of the converging mechanism taken substantially along sight line 3—3 of FIG. 1, a portion of the front of the frame of the rake being broken away to reveal details of the mechanism therebehind.

As will be noted perhaps most readily in FIGS. 3 and 4, the tine bars 70,72, and 74 are attached at their opposite ends via suitable bearing assemblies 82 to the discs 76 and 78, such points of attachment being located near the outer peripheries of the discs 76,78 and at three equally angularly spaced locations. Thus, as the discs 76,78 rotate about their respective fore-and-aft axes, the tine bars 70,72, and 74 move in generally elliptical paths of travel which include laterally inwardly directed components of travel. Therefore, tines 84 which depend from the bars 70,72, and 74 at spaced locations along their length remain in their vertically oriented positions as the bars are driven, each of the tines moving in a generally circular path of travel. However, since the tines 84 in the entire assembly present a staggered pattern, as viewed from the front, the net effect at any one time is to have a plurality of the tines moving generally horizontally and linearly inward toward the path of the pickup as the discs 76,78 are rotated in the direction shown in FIG. 3.

The front disc 76 of each rake 44,46 is driven by the corresponding rear disc 78 via the bars 70,72, and 74. Each disc 78, in turn, receives its driving input power from the same shaft used to supply driving power to the pickup 38. Such shaft for the pickup 38 is the shaft 86 illustrated in FIG. 2, extending clear across the baler and projecting outwardly from opposite sides thereof. A pair of bevel gears 88 are provided at opposite ends of the shaft 86. The shaft 86 is, in turn, driven by a large sprocket 90 on its left end inboard from the bevel gear 88, which sprocket 90 is entrained by a drive chain 92 as illustrated in FIG. 1, which receives driving input power from other drive mechanism of the baler.

Each bevel gear 88 meshes with a driven bevel gear 94 at the rear end of a fore-and-aft extending shaft 96 that is affixed at its forward end to the rear of the disc 78 in the center of the latter to provide driving power thereto. A sleeve 98 rotatably receives the fore-and-aft shaft 96 to act as a bearing for the latter and is in turn encircled at its midpoint by a collar 100 fixed to an inner mounting bracket 102 rigidly mounted on the sidewall 18. The collar 100 is stationary and serves as a bushing to rotatably support the sleeve 98. Sleeve 98 is, in turn, fixed to an outer bracket 104 pivotally connected to the inner bracket 102 by a fore-and-aft pivot bolt 106 at the rear. The pivot bolt 106 is axially aligned with the shaft 96, sleeve 98, and collar 100, and the inner end of frame arm 50 is fixed to the outer bracket 104, thus rendering the entire rake 44 or 46 swingable up and down about the fore-and-aft axis shared by pivot bolt 106, shaft 96, sleeve 98, and collar 100.

It is to be noted that the discharge end of each rake 44,46, as represented by the inner extremities of the respective frame arms 52, is located generally in fore-and-aft alignment with the endmost tines 108 and 110 of the pickup 38. Thus, hay that is delivered inwardly by the rakes 44,46 is in far enough to be engaged by the tines of the oncoming pickup 38.

Additionally, it will be noted that the discharge points of the two rakes 44,46 as represented by the inner slightly curved ends of the frame arms 52 are located somewhat spaced forwardly from the pickup 32 so that the velocity imparted to the inwardly moving crop material may be reduced or even halted completely by the time the crop material is engaged by the pickup 38.

Operation

The operation and use of the pickup 10 and the windrow converging mechanism 42 should be readily apparent from the foregoing description. Therefore, suffice it to point out that as the baler 10 moves forward along a windrow, and the rakes 44,46 are in operation, there is a generally linearly inward raking action provided by the two rakes 44 and 46. As outlying materials are encountered, the rake tines simply engage such materials and convey them inwardly to be picked up with the rest of the windrow by the oncoming pickup 38. In most cases, the operator need only drive straight down the windrow, instead of weaving from side-to-side as has heretofore frequently been necessary to obtain an evenly shaped bale from end to end, although in some instances the operator may intentionally desire to load the hay more heavily on one end of the bale than the other. In that instance, he need only align the baler so that the windrow is aligned with the selected rake 44 or 46 and the pickup 38, while leaving the other rake 44 or 46 outside of the windrow without any material to engage and transfer inwardly. Thus, only that end of the bale associated with the selected rake will receive an extra measure of crop material.

It is important to recognize that through the use of the rotating bar-style rakes 44 and 46, the rakes themselves can be manufactured in any number of suitable lengths without increasing the over all height of the mechanism. Whereas, with crowder wheels it was necessary to increase the over all diameter of the wheels in order to achieve an increased dimension in a lateral sense, with the rakes 44 and 46 of the present invention it is only necessary to lengthen the tine bars to the extent necessary while maintaining the diameters of the mounting discs 76 and 78 the same. Thus, significant flexibility can be achieved insofar as windrow widths are concerned without encountering interference with overhead structural portions of the baler.

Moreover, whereas crowder wheels of the prior art are ground driven and are thus rotating slowly, or hardly at all, when the baler itself is moving slowly, the rakes 44 and 46 of the present invention can be maintained at a constant speed of operation regardless of the speed of advancement of the baler, due to the positive drive arrangement utilized for the rakes 44 and 46. Preferably, the discs 76 and 78 of the rakes 44 and 46 are driven somewhat faster than the tines of the pickup 38, on the order of one and a half to two times as fast.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In combination with a round baler having a pickup, crop converging mechanism for the pickup comprising:
   a pair of rakes on opposite sides of the path of travel of the pickup forwardly of the latter and projecting outwardly beyond opposite, lateral extremities of the pickup for engaging outlying crop materials and raking the same into the path of travel of the pickup as the baler advances,
   each of said rakes including a plurality of tines movable transversely inwardly toward the path of travel of the pickup while in an upright attitude; and
   drive means operably coupled with the rakes for driving said tines,
   said tines depending from a plurality of elongated, parallel, generally horizontally extending tine bars and being movable in generally upright planes,
   said rakes each including a frame supporting said tine bars,
   each of said frames having means swingably mounting the same on the baler for up and down movement about a fore-and-aft axis,
   each of said frames being provided with a ground wheel offset laterally from said axis for allowing the rakes to swing vertically relative to the pickup in response to changes in ground contour.

2. In the combination as claimed in claim 1,
   said drive means including a drive shaft for each of said rakes respectively having an axis of rotation coinciding with the axis of swinging movement of the frame of the rake.

3. In the combination as claimed in claim 1,
   said baler having an internal baling chamber provided with an entrance adjacent the bottom of the chamber,
   said pickup and said entrance having substantially the same width measured in a direction transverse to the path of travel of the baler.

4. In the combination as claimed in claim 3,
   said baling chamber being expandable and initially comprising a pair of fore-and-aft spaced, generally upright, oppositely movable surfaces for contacting crop materials introduced into the chamber and causing the same to coil into a bale.

* * * * *